United States Patent Office 3,130,156
Patented Apr. 21, 1964

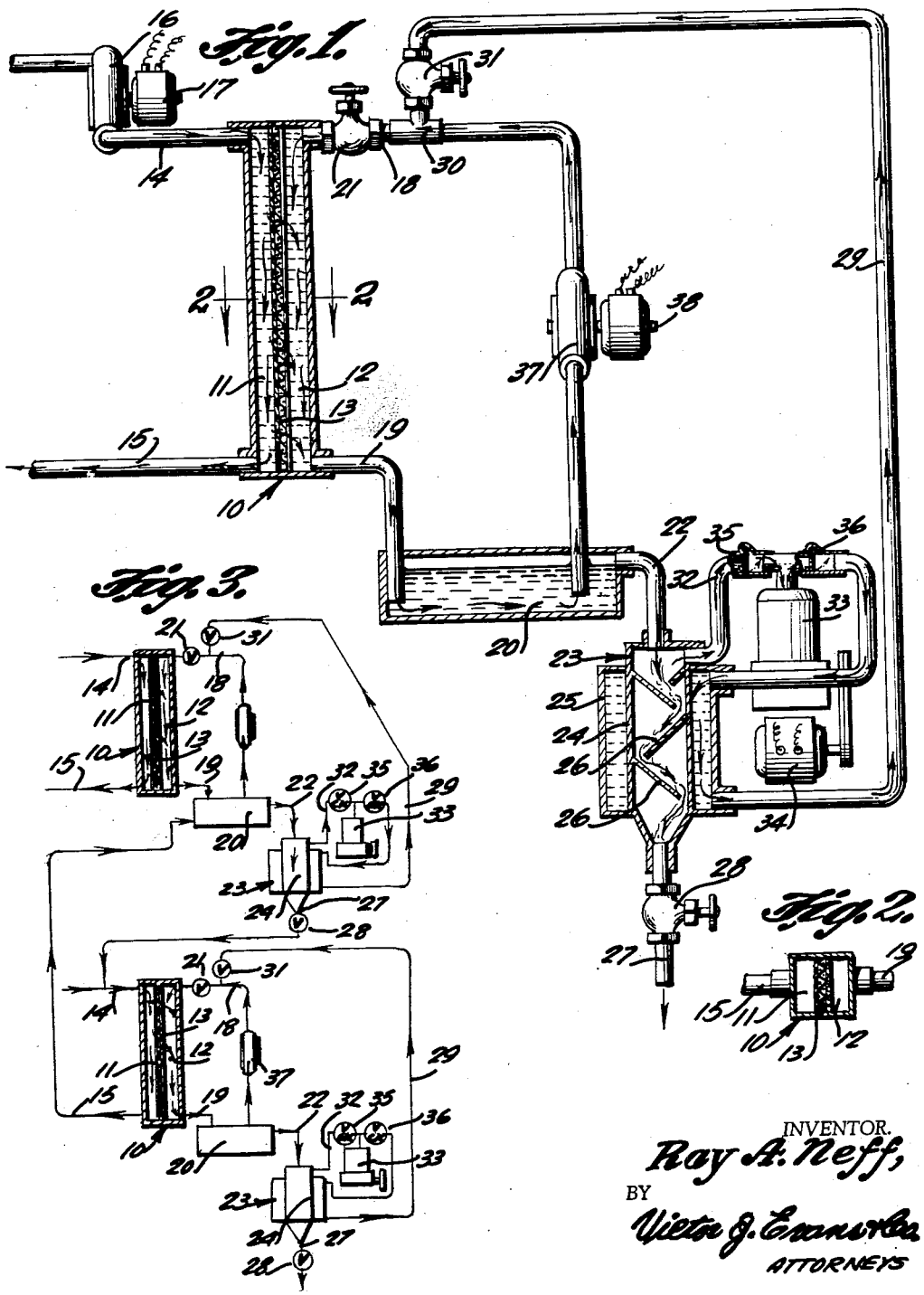

3,130,156
SOLVENT EXTRACTOR
Ray A. Neff, 53 Winding Way, Gibbsboro, N.J.
Filed Dec. 13, 1960, Ser. No. 75,631
1 Claim. (Cl. 210—152)

This invention relates to a solvent extractor, and more particularly to a method and means for extracting various types of solvents from different types of solutes.

The primary object of this invention is to provide a means whereby various types of solvents can be extracted from different types of solutes as for example saline water can be treated so as to extract potable water from sea water or the like.

A further object of the invention is to provide a solvent extractor which can be used with various types of solutions, as for example it can be used for extracting water which is potable from sea water which contains about 35,000 parts per million of sodium chloride plus certain other dissolved solids, and wherein the present invention is also adapted to be used in industries which require the concentration of salt or sugar solutions, drugs or numerous other compounds, and wherein the solvent may or may not be water but need only be one in which the dissolved solids exert an osmotic pressure, and also the extraction need not be a one-step operation.

A still further object of the present invention is to provide a solvent extractor which includes a two-compartment or two-chamber unit wherein the two chambers or compartments are separated by a semi-permeable membrane, and wherein hydrostatic pressure is adapted to be maintained at a higher level in one chamber than in the other, and also a temperature differential is maintained between the solutions in the chambers, and wherein the field in one chamber contains a higher concentration of solute to solvent than the fluid in the other chamber.

Still another object is to provide such a solvent extractor that is economical to manufacture and use, and efficient in operation and which is rugged in structure and foolproof in operation.

These and other objects of the invention will become apparent from a reading of the following specification and claims, together with the accompanying drawing, wherein like parts are referred to and indicated by like reference characters and wherein:

FIG. 1 is an elevational view illustrating the solvent extractor of the present invention, and with parts broken away and in section.

FIG. 2 is a sectional view taken on the line 2—2 of FIG. 1.

FIG. 3 is a schematic view illustrating several of the solvent extractors connected in series.

Referring in detail to the drawings, the numeral 10 indicates a two-compartment or two-chamber unit which includes a pair of chambers 11 and 12 that are separated by a semi-permeable membrane 13. The numerals 14 and 15 indicate fluid inlet and outlet conduit means for the first chamber 11, and the numeral 16 indicates a conventional pump that is adapted to be operated by a motor 17 for pumping the fluid through the conduit 14 into the chamber 11.

As shown in FIG. 1 for example, there is provided fluid inlet and outlet conduit means 18 and 19 for the second chamber 12. The numeral 20 indicates a fluid storage tank for receiving fluid from the outlet conduit 19, as later described in this application. A control valve 21 is arranged in the conduit 18.

The numeral 22 indicates an overflow line which is connected to the tank 20, and there is provided a unit 23 which includes a column 24 for receiving fluid from the overflow line 22. The unit 23 further includes a fluid jacket 25 that surrounds the column 24. A discharge line 27 depends from the lower end of the column 24, and a control valve 28 is arranged in the discharge line 27.

As shown in the drawings, there is provided a conduit or return line 29 which serves to connect the lower portion of the jacket 25 to the inlet conduit 18 as at 30, and a control valve 31 is arranged in the line 29.

The numeral 32 indicates a conduit or bypass line which serves to connect the upper end of the column 24 to the upper portion of the jacket 25, and a suitable compressor 33 is operatively connected in the line or conduit 32, and the compressor 33 is adapted to be operated as for example by means of a motor 34. As shown in FIG. 1 the column 24 may be provided with a plurality of inclined spaced apart baffles 26 whereby the fluid flowing over these baffles will have a cascade effect in order to increase the efficiency of the device.

Check valves 35 and 36 may be arranged in the line 32 as desired or required.

The numeral 37 indicates a pump which is operatively connected in the line 18, and the pump 37 is adapted to be operated by means of an electric motor 38.

From the foregoing, it is apparent that there has been provided a solvent extractor, and in use with the parts arranged as shown in the drawings for example, saline water may be pumped into the unit 10 through the conduit 14 and into the chamber 11, and the unit 10 in effect is a two-compartment chamber wherein the two chambers 11 and 12 are separated by the semi-permeable membrane 13. The saline water is exhausted at 15. In the chamber 12 there is a solution of a suitable soluble solute in a solvent which in this particular instance is ammonium bicarbonate (M. W. 79.06) in water (solubility; 15 grams percent at 18 degrees C.). This solution is circulated by a pump such as the pump 37 which may be operated by the motor 38 for pumping the solution from the storage tank 20. In view of the fact that the concentration of dissolved molecules in 12 is about 2 moles per liter and that in 11 about .6 mole per liter, the osmotic pressure in chamber 12 will be greater (3:1) than in chamber 11 and this will therefore cause a flow of water through the membrane 13 from the chamber 11 to the chamber 12.

The solution on the right side of the membrane 13, FIG. 1, is also flowing through the conduit 19 to the storage tank 20, and the amount of water coming through the membrane will overflow at 22 into the unit 23 where it is heated to remove the dissolved ammonium bicarbonate as ammonia and carbon dioxide, and the water will be discharges at 27 and this water which is discharged at 27 is the extracted water.

The ammonia and carbon dioxide are pumped off by the compressor 33 and compressed, and the compressed ammonia-carbon dioxide can be used as a source of heat by being circulated through the jacket 25 which surrounds the column 24. If additional heat is needed to volatilize the ammonia-carbon dioxide off, it can be supplied in any suitable manner, as for example by means of an external heat source. Also, if it is necessary, the gas can be cooled further in the return line 29.

As shown in FIG. 1 for example, there is provided a control valve 31 for controlling the flow of ammonia-carbon dioxide back into the solvent at 18, and there is also a control valve at 21 which prevents a build up of pressure in chamber 12.

The temperature at the point 30 is somewhat critical, 18 degrees centigrade being about the optimum for best results according to experiments that have been conducted.

Although the present invention has been illustrated and described in connection with saline water, it is to be understood that the present invention is not restricted to saline water and the units or present invention can be used for extracting various types of solvents from many types of solutes. Also, while an ammonium bicarbonate water system has been described for use in chamber 12, many other types are possible. The principles embodied are three fold and all are independently effective and additive and are as follows.

(1) *Hydrostatic pressure.*—The pressure in chamber 11 is maintained at a higher level than in chamber 12, the limiting factor for pressure differential being the strength of the membrane 13. The hydrostatic pressure helps to overcome the osmotic pressure of the salt water.

(2) *Temperature differential.*—A temperature differential is maintained between the solutions in chambers 11 and 12, chamber 11 being warmer than chamber 12. According to experimental data a temperature of 40° C. in chamber 11, and 18–20° C. in chamber 12 is optimum, and this further enhances or increases the flow of water from chamber 11 to chamber 12.

(3) *Dissolved molecules.*—Chamber 12 contains about 2 moles of solute per liter of solvent, while chamber 11 contains about .6 mole of solute per liter of solvent. This produces an osmotic pressure gradient across the membrane 13 of about 3:1 comparing chamber 12 with chamber 11, and this will result in a flow of water from chamber 11 to chamber 12.

In the herein cited example, ammonium bicarbonate is used because the solvent in chamber 11 is water and it is desirable to get rid of the dissolved solute (ammonium bicarbonate) in chamber 12 by the use of heat, the solute being reusable.

It is to be noted that when heated ammonium bicarbonate decomposes at 35–60° C. (standard temperature and pressure) into ammonia, carbon dioxide, and water, and it is likewise easily formed from water, carbon dioxide and ammonia at a temperature of 18–20° C. as follows:

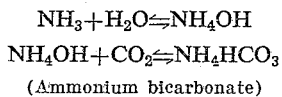

$$NH_3 + H_2O \rightleftharpoons NH_4OH$$

$$NH_4OH + CO_2 \rightleftharpoons NH_4HCO_3$$

(Ammonium bicarbonate)

This means that the solvent in chamber 12 will be easily stripped of the solute by heating, and in the case of the production of irrigation water from sea water, any residual ammonia will be an asset since it is a source of available nitrogen.

Also, there is an optimum flow of saline water through chamber 11, and in the case of sea water, it is easier to remove a little water from a lot of sea water than to attempt to remove all of the water. In industrial usage of the system such as the present invention embodies for the removal of a solvent or the concentration of a solute, the intake of a second unit or system could be hooked to the outlet 15 of a first unit and an entire series linked together to greatly concentrate stepwise, the solute. This is illustrated in FIG. 3 of the drawings wherein a pair of systems or units are shown hooked in series. In a case such as this a supporting solute might be needed in chamber 12 to further increase the osmotic pressure, and it is also possible to link the outlet 27 of one unit to the intake 14 of another so as to remove the supporting solute from the extracted solvent.

It will therefore be seen that according to the present invention there has been provided a means which is especially suitable for extracting water which is potable from sea water which contains about 35,000 parts per million of sodium chloride plus certain other dissolved solids. The dissolved solids in sea water total about 0.6 mole of solids per liter of sea water. Osmotic pressure is directly proportional to the number of particles in the solution so that the salt in sea water exerts a substantial pressure. In the present invention this osmotic pressure is more than offset by the greater osmotic pressure of a near-saturated solution of ammonium bicarbonate on the other side of the semi-permeable membrane such as the membrane 13. Since the natural tendency is towards equilibrium, pure water will flow through the membrane 13 from the less tonic sea water into the more tonic ammonium bicarbonate solution. However, equilibrium is not allowed since the sea water is continually being changed and the ammonium bicarbonate solution is being circulated. If the sea water were permitted to stop flowing and the ammonium bicarbonate solution were not circulated, equilibrium would eventually be reached with the sea water being more concentrated and the ammonium bicarbonate solution being less concentrated. But instead, a volume of ammonium bicarbonate solution equivalent to the amount of water that passed through the membrane overflows into a degassing unit and the ammonium bicarbonate decomposed thermally to ammonia and carbon dioxide. The water then comes off as near pure water. If a slight vacuum is kept on the degassing unit almost all of the ammonia and all of the carbon dioxide will come off if the temperature is maintained at 50° C., and this leaves a water that while not so tasty is entirely drinkable, or potable.

In addition the present invention can be used for other purposes besides providing potable water from sea water. For example in industries which require the concentration of salt or sugar solutions, drugs or other compounds, the present invention can be adapted to perform the desired function or task. Also, the solvent need not be water, and need only be one in which the dissolved solids exert an osmotic pressure.

Furthermore, the extraction need not be a one-step operation, and if the osmotic pressure of the solution is not in such a range as to be extracted by ammonium bicarbonate or one of the many other compounds usable, the same end may be gained by using a supporting solute in the extracting solution and then extracting the supporting solute from the extracted solvent by the use of a second unit. For example, if one were trying to extract the solvent (water) from a solution of salt with a concentration of 2.5 moles of salt per liter of solution, it could not be done with a 2 mole per liter solution of ammonium bicarbonate, but it could be done if in addition to two moles per liter of ammonium bicarbonate, there was one mole per liter of salt since this would then give the extracting solution a tonicity of 3 moles per liter which could extract water from the 2.5 mole per liter salt solution. The unit would discharge, not pure water but salt solution with the concentration of the supporting solute, in this case one mole per liter. This would mean that in one step the salinity of the original salt solution had been decreased from 2.5 moles per liter to one mole per liter. The one mole per liter solution could then be run into a second unit with an extracting solution of ammonium bicarbonate and this time the entire salinity would be removed. This would mean that in a two-step operation the water extracted had had 2.5 moles of salt removed from each liter. By linking several units in series a salt solution could be greatly concentrated and similarly, other dissolved solids could be concentrated.

When two units are linked together and a supporting solute is used, the outlet 27 of one unit is adapted to be fed directly into the inlet 14 of the other unit, and in this case the outlet 15 of the second unit would then be returned to the reservoir 20 of the first unit so that the supporting solute would be returned to the first unit.

Under certain conditions, the direction of flow in the zone 11 may be in a direction that is opposite to the direction of flow in the zone 12, so that when certain types of materials or substances are being processed, greater efficiency may be possible, and this method of operation can be accomplished by supplying fluid to the zone or chamber 11 from a suitable source of supply through the conduit 15, and by utilizing the line 14 for the material leaving the chamber 11.

Minor changes in shape, size and rearrangement of details coming within the field of invention claimed may be resorted to in actual practice, if desired.

What is claimed is:

1. In a solvent extractor for extracting potable water from saline water including a two compartment unit and a semi-permeable membrane separating said unit into first and second chambers, said membrane being permeable to water but impermeable to saline solution and ammonium bicarbonate solution, fluid inlet and outlet means connected to each of said first and second chambers, the inlet of said first chamber being connected to a source of saline water, a fluid storage tank having an inlet and an overflow outlet, said tank inlet being connected in communication with the outlet of said second chamber, a pump and connected conduits for re-circulating liquid from said tank back to said second chamber, a gas-liquid separating column having an inlet for liquids connected in communication with said overflow outlet and having an outlet for liquid, said column having an outlet for gas, a compressor having an inlet and an outlet, the inlet of said compressor being connected to said column gas outlet, and a heat exchanger jacket surrounding said column and having an inlet connected to said outlet of said compressor, said heat exchanger having an outlet connected in communication with said second chamber.

References Cited in the file of this patent

UNITED STATES PATENTS

| | | |
|---|---|---|
| 1,885,393 | Schaack | Nov. 1, 1932 |
| 2,411,239 | Reichel et al. | Nov. 19, 1946 |
| 2,797,166 | Siciliano et al. | June 25, 1957 |
| 3,062,737 | Azorlosa et al. | Nov. 6, 1962 |

OTHER REFERENCES

Prutton, C. F.: Fundamental Principles of Physical Chemistry, N.Y., Macmillan, 1951, pp. 199–208. (Personal copy in Div. 67.)

American Chemical Society, Saline Water Conversion; Washington, 1960; 246 pages, page 182 of note. (Copy in Div. 67.) S.W./Digest.